J. WALDEN.
Machinery for Goring Gaiters.
No. 5,488. Reissued July 15, 1873.
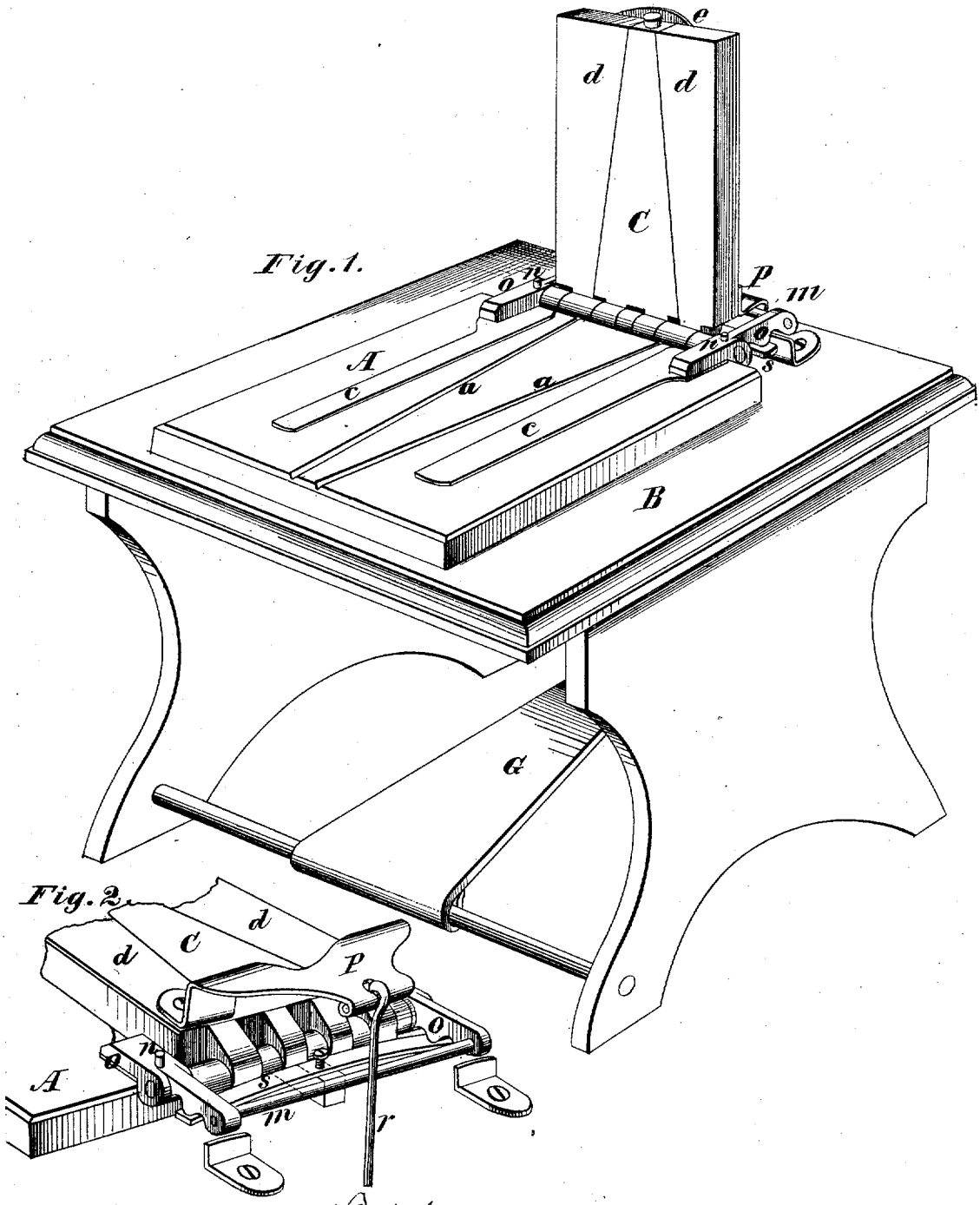
Witnesses. C. Delafield
Inventor. Joseph Walden By Amos Broadnax Atty.
AM. PHOTO-LITHOGRAPHIC CO. N.Y. (OSBORNE'S PROCESS.)

UNITED STATES PATENT OFFICE

JOSEPH WALDEN, OF NEWARK, NEW JERSEY, ASSIGNOR OF ONE-HALF INTEREST TO GEORGE PLATTS.

IMPROVEMENT IN MACHINERY FOR GORING GAITERS.

Specification forming part of Letters Patent No. 126,598, dated May 7, 1872; reissue No. 5,488, dated July 15, 1873; application filed August 12, 1872.

*To all whom it may concern:*

Be it known that I, JOSEPH WALDEN, of the city of Newark, in the county of Essex and State of New Jersey, have invented a new and Improved Machine to be used in Fitting the Elastic Gores in a certain style of shoes, known as Congress Gaiters; and I do hereby declare the following to be a full, clear, and exact description of the construction and operation of the same, reference being had to the annexed drawing, in which—

Figure 1 is a perspective view of the whole of said machine taken from the front right-hand corner; and Fig. 2 is a perspective view of a part of said machine taken from the rear left-hand corner thereof, showing the construction of the back and upper part of the machine.

Similar letters of reference represent corresponding parts of the different figures composing the drawing.

To ascertain exactly the nature and extent of my invention, and before describing the construction and operation of the machine, it is necessary to state the work it is intended to do, and to explain how that work is done on said machine.

In the manufacture of Congress gaiters the various parts of the body or upper of the shoe are first cut to the desired form, and are then fitted and stuck together with gum preparatory to sticking them. In fitting the different parts of the shoe together by hand the workman usually commences by folding over the edges of the top of the lining and around the opening made in the side to receive the elastic gore that distinguishes this variety of shoe. After these edges are folded the face of the fold, or as much of it as may be necessary, is covered with gum. The edges of the elastic gore are then laid upon the folds and the edges of the upper—that is, the leather or outside of the shoe—upon the elastic gore, the edges of which or of the leather being first gummed. The several parts are then pressed together with sufficient force to make them adhere to one another. Instead, however, of gumming the folds of the lining or the edges of the outside or upper, perhaps the better practice is to gum both sides of the edges of the gore, which very much facilitates the work of fitting in case proper means be provided for gumming.

This work of fitting and sticking together the several parts of this variety of shoe has hitherto been done by hand or upon complicated and expensive machinery.

The object of my invention is to facilitate, simplify, and cheapen the doing of this work by machinery. This object I accomplish through the agency of a machine consisting of four principal parts—first, a grooved plate, illustrated in the drawing by A; second, a pair of clamps, illustrated by *c c;* third, a guide-clamp, illustrated by C; fourth, a pair of press-plates, shown by *d d.* The functions of the plate A are, first, to serve as a platform, upon which all the work is done; second, to indicate the position in which the different-sized linings are to be placed preparatory to folding the edges; third, to facilitate the folding after the lining has been placed in position and secured by the clamps *c c.* This plate is secured upon a table, B, raised high enough to bring it within convenient reach of the operator, the table making a platform to hold the work to be fitted. The position in which the different-sized linings are to be placed on the plate A is indicated by the grooves *a a*, which are cut at an angle to each other to correspond with the angle of the gore, which should be the same in all sizes, the space between the grooves decreasing in width as the size decreases in number, and vice versa, the lining being shoved back on the plate until the edge of the gore opening laps in over the grooves far enough to form the fold. The edge of the lining is then raised up by forcing the fabric in the said grooves with a thin, flat, blunt-pointed instrument called a creaser. The edges are then turned over on the crease, completing the fold. By these means, if the different-sized linings be always placed on the same corresponding part of the plate, the size of the gore-opening in the different-sized shoes will all be the same. From this it will appear that these grooves form and include a scale of sizes. They mark the place where the crease is to be made, making the gore-opening of the several sizes always the same, and they facilitate the turning of the fold; indeed, they alone make it possible to accurately turn the folds straight and of equal width. The function of the clamp *c c* is merely to hold the lining in position while the edges of the gore-opening are being creased and folded. The function of the guide-clamp C is to hold the gore in position after it has been placed on the folds of the lining, and to furnish a stop or guide to lay the upper or outside of the shoe against when it is placed in position upon the gore; and the function of the press-plates *d d* is to press the several parts together with sufficient force to make them adhere. The press-plates *d d* and guide-clamp C are hinged to the plate A, the clamp being set between the press-plates and held, when up in the position shown in the drawing, by means of a spring, *e*. The press-plates *d d* are operated either by the hand or by means of a treadle, G, connected to the back and rear end of the plate by means of a bracket, P, and a rod, *r*, in the manner shown by the drawing. The clamps *c c* are also operated either by hand or through the agency of the treadle G. The hinge-pin of the plates *d d* passes through arms *o o*, reaching back to receive the pin and embrace both sides of the plates *d d*. The rear ends of these arms *o o* extend back beyond the hinge-pin, and are connected by means of a rod, *m*, against the under side of which a spring, *s*, is made to press, and force the clamps down upon the face of the plate A to hold the lining. The rear ends of the arms *o o* act as levers, the fulcrums of which is the hinge-pin. The spring *s* is secured in a bracket bolted to the rear end of the plate A, and is adjusted by means of a set-screw, as shown.

Now, after the press-plates *d d* are raised up to the position shown in the drawing, the clamps *c c* are raised by pressing upon the treadle G, which brings the bracket P against the cross-bar *m*, the spring *s* forcing them down as soon as the power is removed from the treadle.

In operating the machine, the press-plates *d d* and guide-clamp C are first raised to the position shown in drawing. The clamps *c c* are then raised, as above described. The lining of a shoe—say, No. 6—is then shoved under the clamp *c c* until the inside edge of the gore-opening laps in over the grooves *a a* far enough to form the fold. The bottom edge of the gore-opening is then turned over. The inside edges are then pressed in the grooves, and folded over on the crease. The elastic gore is then laid on the folds, and the guide-clamp brought down to hold it in position, leaving a parallel margin of the fold on each side of the clamp about a quarter of an inch wide. The back edge of the front upper is then laid on the fold against the front side of the clamp, and the front edge of the back upper against the back side of said clamp on the fold. The press-plates are then brought down, forcing the several parts together with sufficient force to make them stick, always assuming, of course, that the edges of the gore or of the lining and upper have been duly gummed, as above described.

Having now described the construction and operation of my machine, I claim as my invention—

1. The grooved plate A, when made to mark the position in which the lining is to be placed thereon to be folded, and with grooves to aid in folding the edges around the gore-opening, as described.

2. The plate A, made substantially as described, in combination with the spring-clamps *c c*, arranged to receive the shoe-lining and hold it in its adjusted position on said plate while the edges are being creased and folded, as described.

3. The tapering guide-clamp C, made and combined with the plate A to hold the elastic gore, and furnish a guide to set the front and back of the different-sized upper against, as set forth.

4. The press-plates *d d*, combined with the plate A to press the gore, the lining, and the upper, or either two of them, together, as described, for the purpose specified.

JOSEPH WALDEN.

In presence of—
A. W. GREEN,
AMOS BROADNAX.